(12) United States Patent
Drane et al.

(10) Patent No.: US 7,622,676 B2
(45) Date of Patent: *Nov. 24, 2009

(54) ELECTRICAL OUTLET BOX FACE PLATE WITH ADAPTER PLATE

(75) Inventors: Mark R. Drane, Germantown, TN (US); Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 20 days.

This patent is subject to a terminal disclaimer.

(21) Appl. No.: 11/805,258

(22) Filed: May 22, 2007

(65) Prior Publication Data

US 2008/0293293 A1 Nov. 27, 2008

(51) Int. Cl.
H02G 3/04 (2006.01)

(52) U.S. Cl. .......................... 174/66; 174/67; 220/241; 220/242; 439/536

(58) Field of Classification Search ............ 174/66, 174/67, 480, 481, 50, 53, 57, 58, 135; 220/3.2–3.9, 220/4.02, 241, 242; 439/535, 536; D13/156, D13/177; 411/339, 324, 510, 913
See application file for complete search history.

(56) References Cited

U.S. PATENT DOCUMENTS

| | | | |
|---|---|---|---|
| 3,619,477 A * | 11/1971 | Rasmussen ................... | 174/56 |
| 3,987,928 A * | 10/1976 | Mori .......................... | 220/241 |
| 4,134,516 A | 1/1979 | Sullo | |
| 4,265,365 A | 5/1981 | Boteler | |
| 4,424,407 A | 1/1984 | Barbic | |
| 4,505,403 A | 3/1985 | Bowden, Jr. et al. | |
| 4,534,486 A * | 8/1985 | Eidson ....................... | 220/241 |
| 4,673,097 A | 6/1987 | Schuldt | |
| 4,724,281 A | 2/1988 | Nix et al. | |
| 4,988,832 A | 1/1991 | Shotey | |
| 5,171,939 A | 12/1992 | Shotey | |
| 5,280,135 A | 1/1994 | Berlin et al. | |
| 5,387,761 A | 2/1995 | Simonis | |
| 5,456,373 A * | 10/1995 | Ford .......................... | 220/242 |
| 5,741,102 A * | 4/1998 | Everett et al. ............... | 411/339 |
| 6,133,531 A | 10/2000 | Hayduke et al. | |
| 6,278,062 B1 * | 8/2001 | Sowdon ...................... | 174/66 |
| 6,441,307 B1 | 8/2002 | Shotey et al. ................. | 174/66 |
| 6,476,321 B1 | 11/2002 | Shotey et al. | |
| 6,501,022 B2 * | 12/2002 | Victor ........................ | 174/66 |
| 6,519,208 B2 | 2/2003 | DeVries | |
| 6,583,358 B1 | 6/2003 | Shotey et al. ................ | 174/66 |

(Continued)

Primary Examiner—Angel R Estrada
(74) Attorney, Agent, or Firm—Hoffman & Baron, LLP

(57) ABSTRACT

A face plate assembly for an electrical outlet box having an open side and an electrical fixture contained therein generally includes a face plate member and an adapter plate. The adapter plate is defined by an outer periphery and has an opening therein sized and shaped to receive a portion of the electrical fixture therein. The adaptor plate further includes a projection extending from a back face thereof, which has a size adapted to be received in an aperture of the electrical fixture for aligning the adapter plate thereto. The face plate member has an opening having an inner periphery edge surface smaller than the outer periphery of the adapter plate so that the face plate member is adapted to sandwich the adapter plate against the electrical fixture when mounted to the outlet box, wherein the adapter plate is not attached to the face plate member or the electrical fixture.

20 Claims, 4 Drawing Sheets

U.S. PATENT DOCUMENTS

| | | |
|---|---|---|
| 6,642,453 B2 | 11/2003 | Shotey et al. .................. 174/66 |
| 6,723,922 B1 | 4/2004 | Shotey et al. .................. 174/66 |
| 6,770,814 B2 | 8/2004 | Shotey et al. |
| 6,770,816 B2 | 8/2004 | Shotey et al. .................. 174/66 |
| 6,793,524 B2 | 9/2004 | Clark et al. |
| 5,763,831 C1 | 3/2005 | Shotey et al. |
| 6,872,887 B2 | 3/2005 | Shotey et al. .................. 174/66 |
| 6,891,104 B2 | 5/2005 | Dinh |
| 6,894,223 B1 | 5/2005 | Shotey et al. |
| 6,930,251 B2 | 8/2005 | Shotey et al. |
| 6,956,169 B1 | 10/2005 | Shotey et al. |
| 6,956,171 B1 | 10/2005 | Gretz |
| 6,960,721 B2 | 11/2005 | Shotey et al. .................. 174/66 |
| 6,965,078 B1 | 11/2005 | Gretz |
| 6,987,225 B2 | 1/2006 | Shotey et al. |
| 7,005,578 B2 | 2/2006 | Gretz |
| 7,064,271 B1 | 6/2006 | Gretz |
| 7,071,415 B1 | 7/2006 | Shotey et al. |
| 7,115,820 B1 | 10/2006 | Gretz |
| 7,119,277 B1 | 10/2006 | Shotey et al. .................. 174/66 |
| 7,151,219 B1 | 12/2006 | Gretz |
| 7,166,801 B1 | 1/2007 | Gretz |
| 7,176,379 B2 | 2/2007 | Shotey et al. .................. 174/66 |
| 7,282,643 B2 | 10/2007 | Shotey et al. .................. 174/66 |
| 7,318,732 B2 * | 1/2008 | Kidman ....................... 174/66 |
| 7,390,965 B2 * | 6/2008 | Hartwig ....................... 174/66 |
| 7,425,150 B1 * | 9/2008 | Roe et al. ..................... 174/53 |

* cited by examiner

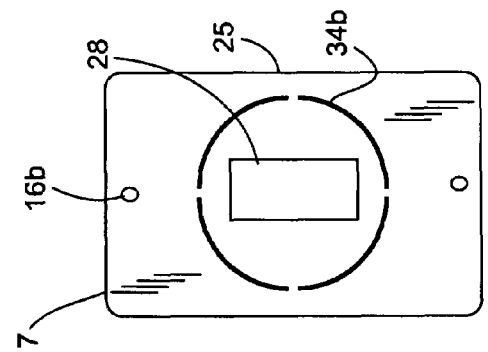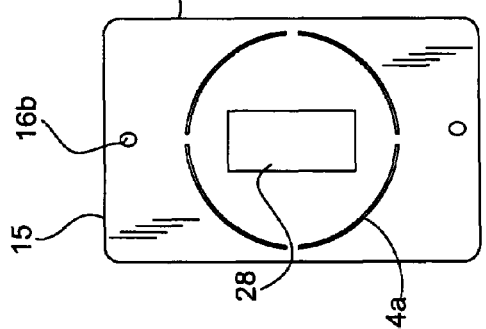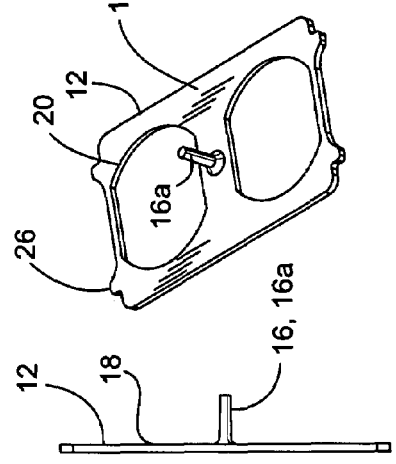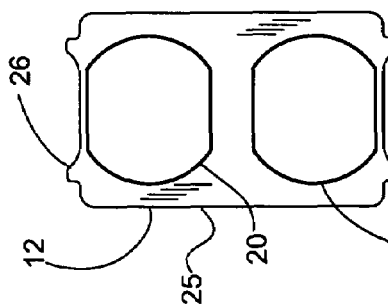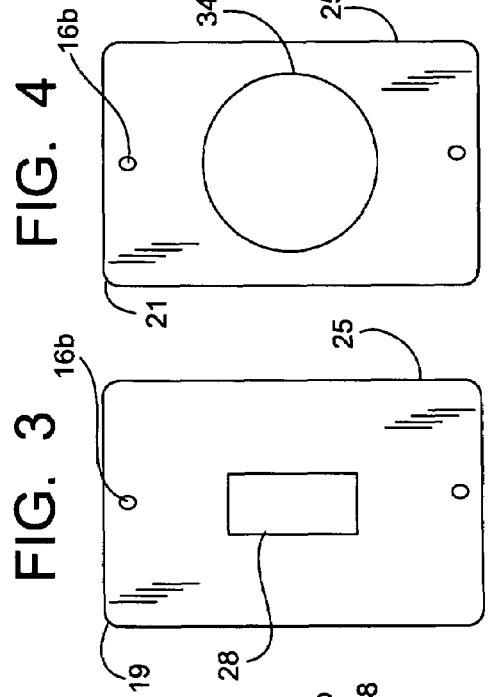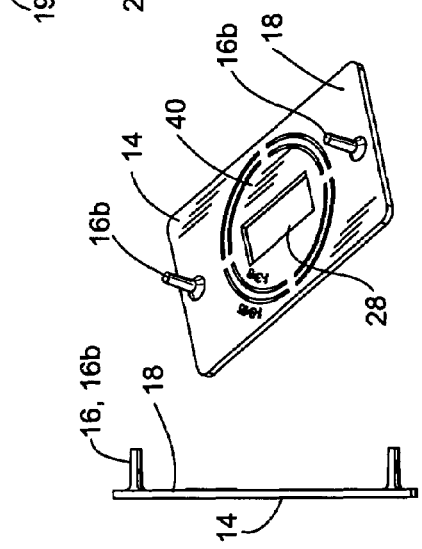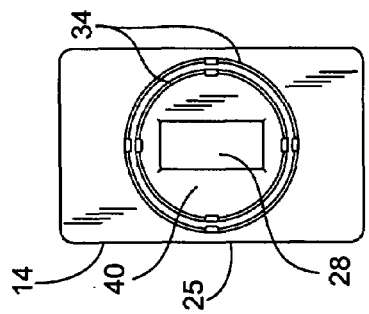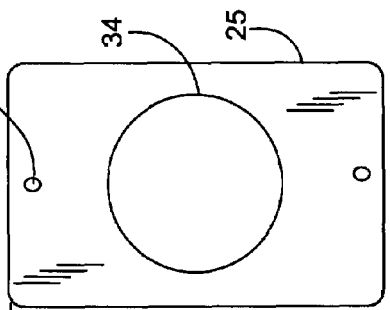

ELECTRICAL OUTLET BOX FACE PLATE WITH ADAPTER PLATE

FIELD OF THE INVENTION

The present invention relates to electrical outlet boxes, and more particularly to a universal face plate assembly for covering the box, which accommodates multiple types of electrical devices, such as duplex receptacles, GFCI receptacles, various switch designs and different sizes of round receptacles.

BACKGROUND OF THE INVENTION

It has long been known to house electrical fixtures such as switches and receptacles in an electrical outlet box. The outlet box permits the insertion of electrical wires into the box which are terminated to electrical fixtures. The fixtures then may be mounted to the box which provides protection to the fixtures as well as the wires terminated therein. The outlet box is then mounted to a wall or other structure at a convenient location to provide access. A face plate or cover is then mounted over the fixture to close off the box, yet maintain the required access to the fixture.

Electrical fixtures for mounting in a standard size outlet box are available in a variety of configurations. Such fixtures include single and duplex receptacles in varying shapes, GFCI receptacles, round receptacles, and various types of switches, including toggle and rocker plates. The selection of which type of fixture to mount within the box is dependant upon the specifics of the application and the desired aesthetic result.

While the outlet box itself is generally universal to the type of fixture mounted therein, a face plate or cover must be selected for each type of particular fixture mounted in the box. For example, a face plate adapted for a duplex receptacle fixture will have two access openings sized and shaped to match the size and shape of the two receptacles of the fixture, whereas a face plate adapted for mounting with a simple single toggle switch will have a single opening having a size and shape matching the toggle switch.

As can be appreciated, the varying shapes and sizes of the access openings prevent the face plates or covers from being interchangeable. As a result, an electrician at a construction worksite would necessarily need to have in his or her possession a collection of various face plates or covers to accommodate all of the possible fixtures. As the face plates or covers are generally well constructed so as to provide suitable protection to the interior of an electrical box, the cost of maintaining a large inventory of such face plates or covers becomes a drawback.

Recently, face plate or cover assemblies have been introduced that are adaptable or convertible to accommodate multiple styles of electrical fixtures. These cover assemblies generally include a number of adapter plates to accommodate the different types of electrical fixtures. With these cover assemblies, the appropriate adapter plate is selected, depending on the type of electrical fixture, and the selected plate is mechanically mounted to the back of the cover. The cover is then mounted to the electrical box.

One drawback with such conventional cover assemblies is the difficulty involved in aligning the cover, with the adapter plate mounted thereto, to the electrical fixture contained within the box. Often, several adjustments must be made between the adapter plate and the cover so that the adapter plate, cover, electrical fixture and outlet box can be properly aligned for mounting.

Accordingly, it would be desirable to provide a universal face plate assembly that is adaptable to a wide variety of electrical fixtures. It would be further desirable to provide such a face plate assembly with means for easy and accurate alignment of all of the cover components during mounting of the cover to an electrical outlet box.

SUMMARY OF THE INVENTION

The present invention is a face plate assembly for an electrical outlet box having an open side and an electrical fixture contained therein, wherein the electrical fixture includes an aperture. The face plate assembly of the present invention generally includes a face plate member and an adapter plate. The adapter plate is defined by an outer periphery and has an opening therein sized and shaped to receive a portion of the electrical fixture therein. The adaptor plate further includes a projection extending from a back face thereof, which has a size adapted to be received in the aperture of the electrical fixture for aligning the adapter plate with respect to the electrical fixture. The face plate member has an opening having an inner periphery smaller than the outer periphery of the adapter plate so that the face plate member is adapted to sandwich the adapter plate against the electrical fixture when mounted to the outlet box, wherein the adapter plate is not attached to the face plate member or the electrical fixture.

The present invention can take the form of a kit for enclosing an electrical outlet box having an open side. In this case, the kit includes a first adapter plate, a second adapter plate and a face plate member. The first adapter plate has an outer peripheral edge and two receptacle openings sized and shaped to receive outlets of a duplex receptacle therethrough. The first adapter plate further includes a projection extending from a back face thereof, wherein the projection has a size adapted to be received in an aperture of the duplex receptacle for aligning the adapter plate thereto. The second adapter plate has an outer peripheral edge and an opening sized and shaped to receive a portion of at least one of a toggle switch and a round receptacle therethrough. The second adapter plate further includes a projection extending from a back face thereof, wherein the projection has a size adapted to be received in an aperture of one of the toggle switch and round receptacle for aligning the adapter plate thereto. The face plate member is sized to substantially cover the open side of the electrical outlet box and has an opening defined by an inner peripheral edge. The inner peripheral edge surface of the face plate is adapted to engage the outer peripheral edge surface of a selected one of the first and second adapter plates to sandwich the selected adapter plate against one of the duplex receptacle, the toggle switch or the round receptacle contained within the electrical outlet box.

The first adapter plate preferably includes a single, centrally disposed projection adapted to be received in a centrally disposed aperture of the duplex receptacle. The second adapter plate preferably includes a centrally disposed rectangular opening formed therein and adapted to receive a toggle member of a toggle switch therethrough. The second adapter plate further preferably includes at least one circular, discontinuous slot formed therethrough around the rectangular opening. The discontinuous slot permits a circular portion of the adapter plate to be frangibly removed to form a circular opening in the second adapter plate adapted to receive a circular outlet of a round receptacle. The second adapter plate further preferably includes two projections extending from the back face thereof, and which are disposed at opposite longitudinal ends of the second adapter plate.

The present invention further involves a method for covering an open side of an electrical outlet box having an electrical fixture contained therein. The method generally includes the steps of inserting a projection formed on a back face of an adaptor plate into an aperture provided in the electrical fixture whereby the adapter plate is aligned with the electrical fixture and mounting a face plate member within the open side of the outlet box, wherein the adaptor plate is sandwiched between the face plate member and the electrical fixture.

The method further preferably includes the step of selecting the adapter plate from a plurality of adapter plates based on the type of electrical fixture contained in the electrical outlet box. The method may also include the step of removing a portion of the adapter plate to create an opening to receive a portion of the electrical fixture therein.

A preferred form of the universal face plate assembly, as well as other embodiments, objects, features and advantages of this invention, will be apparent from the following detailed description of illustrative embodiments thereof, which is to be read in conjunction with the accompanying drawings.

BRIEF DESCRIPTION OF THE DRAWINGS

FIG. 1 is a front plan view of a duplex electrical fixture adapter plate used in the face plate assembly of the present invention.

FIG. 1a is a side view of the adapter plate shown in FIG. 1.

FIG. 1b is a back perspective view of the adapter plate shown in FIGS. 1 and 1a.

FIG. 2 is a front plan view of a switch/round receptacle adapter plate used in the face plate assembly of the present invention.

FIG. 2a is a side view of the adapter plate shown in FIG. 2.

FIG. 2b is a back perspective view of the adapter plate shown in FIGS. 2 and 2a.

FIG. 3 is a back plan view of an alternative embodiment of the switch/round receptacle adapter plate of the present invention.

FIG. 4 is a back plan view of another alternative embodiment of the switch/round receptacle adapter plate of the present invention.

FIG. 5 is a back plan view of a switch adapter plate of the present invention.

FIG. 6 is a back plan view of a round receptacle adapter plate of the present invention.

DETAILED DESCRIPTION OF ILLUSTRATIVE EMBODIMENTS

Figure 7:
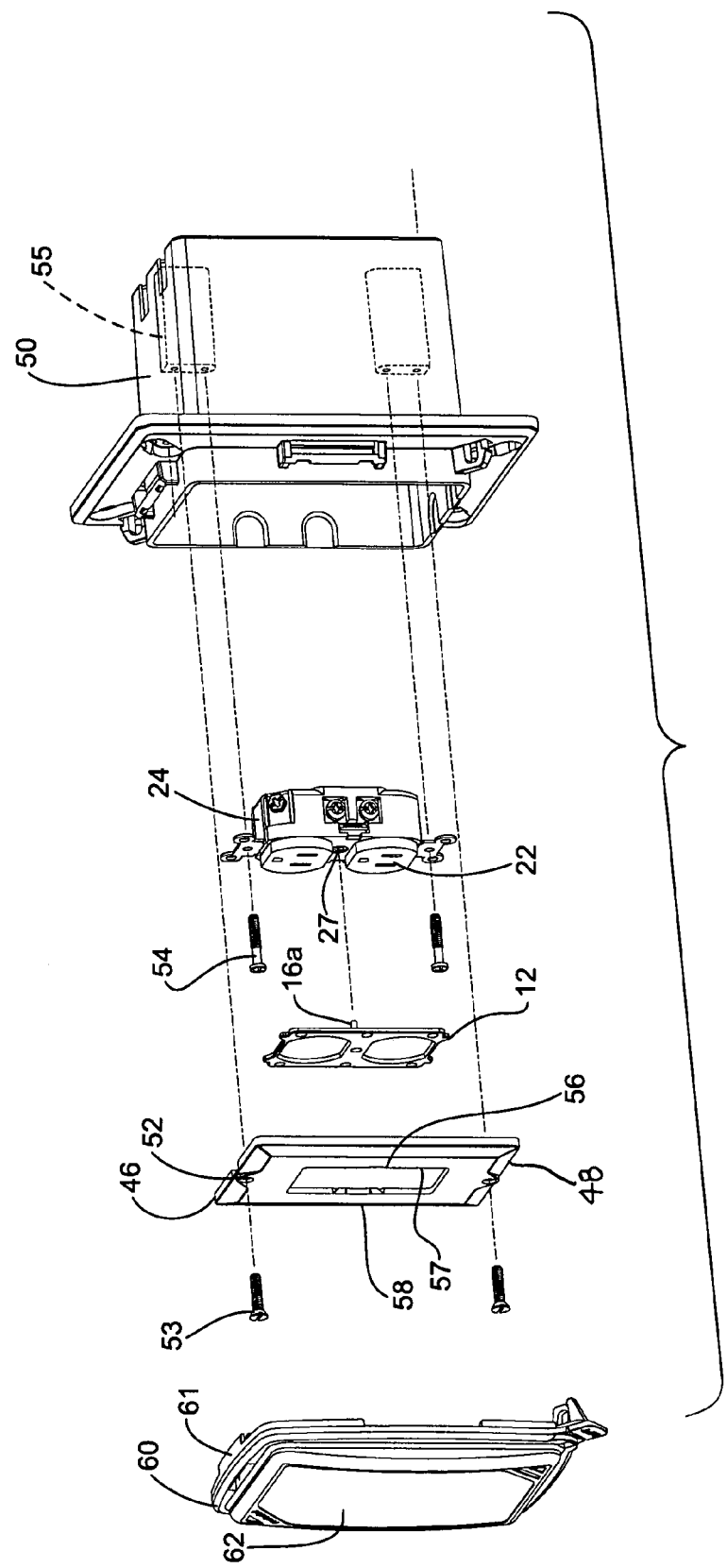
FIG. 7 is an exploded side perspective view of the face plate assembly of the present invention being mounted together with an electrical fixture in an electrical outlet box.

Referring first to FIGS. 1-6, various adapter plates 12, 14, 15, 17, 19, 21 for use with the present invention are shown. For most of the common electrical fixtures used today, only the two adapter plates 12, 14 shown in FIGS. 1 and 2 are required. However, as will be explained in further detail below, the multiple features of the adapter plate 14 shown in FIG. 2 can be divided among multiple adapter plates 15, 17, 19 and 21, as shown in FIGS. 3-6.

All of the adapter plates 12, 14, 15, 17, 19, 21 of the present invention are generally thin planar members and are preferably made from a durable plastic material, such as polyvinylchloride (PVC). All of the adapter plates 12, 14, 15, 17, 19, 21 further include at least one prong or projection 16 extending from a back surface 18 thereof. The function of the prong or projection 16 will be described in further detail below.

Figure 8:
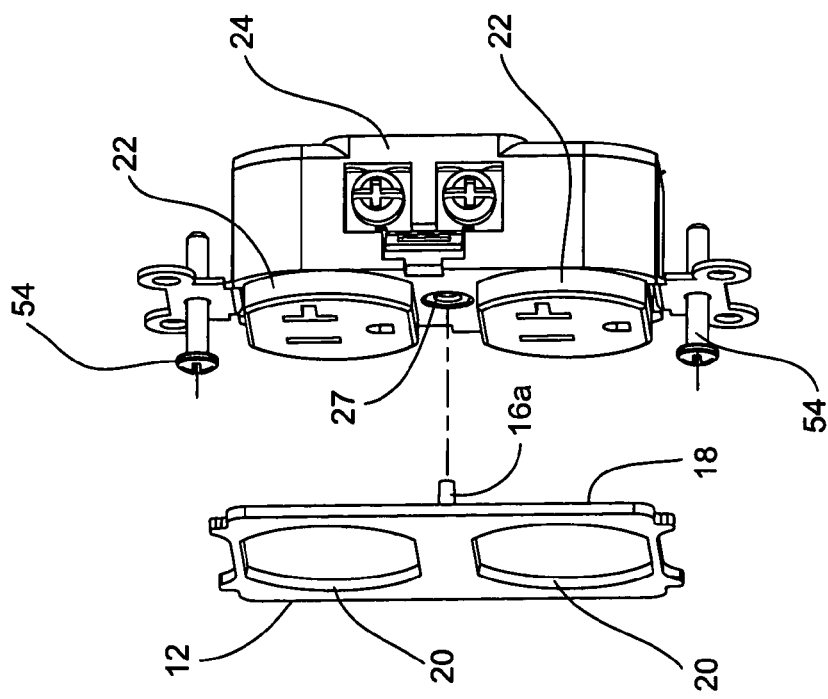
FIG. 8 is a side perspective view of a duplex adapter plate and a duplex receptacle.

The adapter plate 12 shown in FIG. 1 is in the form of a duplex adapter plate. As such, the plate 12 is formed with two receptacle openings 20, which are sized and shaped to receive the two outlets 22 of a conventional duplex receptacle 24, as shown in FIGS. 7 and 8.

The duplex adapter plate 12 includes a single, centrally disposed projection 16a extending generally perpendicular from the back surface 18 of the plate. The projection 16a of the duplex adapter plate 12 has a diameter which is sized to permit the projection to be inserted into a centrally disposed hole 27 formed in the duplex receptacle 24. The diameter of the projection 16a, however, is sufficiently smaller than the diameter of the hole so that the projection will not be attached or secured to the receptacle. Insertion of the projection 16a into the central hole 27 of the duplex receptacle 24 simply aligns the adapter plate 12 with respect to the receptacle and, as will be discussed in further detail below, with respect to the face plate member 46 of the present invention.

Figure 9:
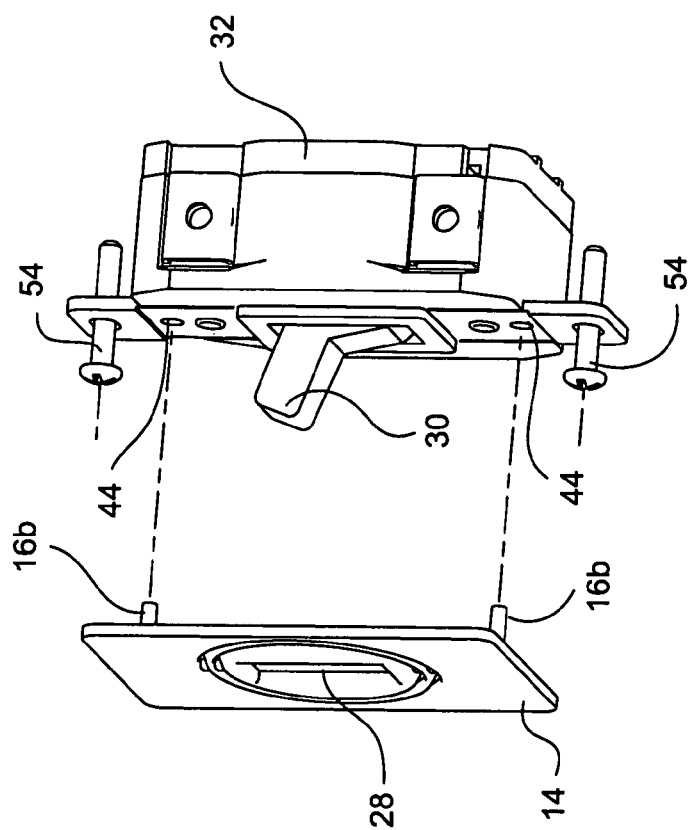
FIG. 9 is a side perspective view of a switch/round receptacle adapter plate and a toggle switch.

The adapter plate 14 shown in FIG. 2 is in the form of a combination toggle switch/round receptacle adapter plate. As such, the plate 14 is formed with a central rectangular toggle switch opening 28 which is sized and shaped to receive the lever 30 of a conventional toggle switch 32, as shown in FIG. 9.

Figure 10:
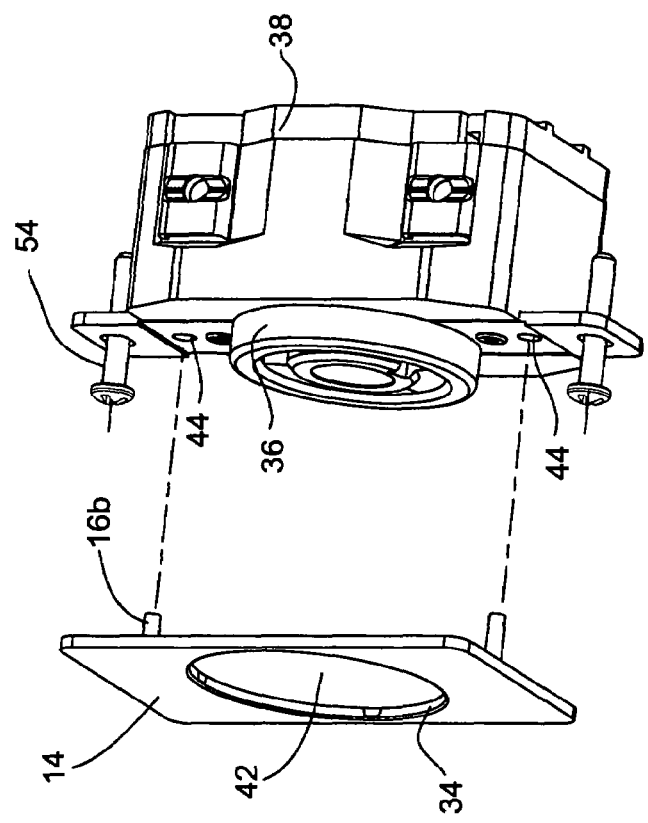
FIG. 10 is a side perspective view of a round receptacle adapter plate and a round receptacle.

The combination toggle switch/round receptacle adapter plate 14 is further formed with one or more circular, discontinuous slots 34 centrally surrounding the toggle switch opening 28. Preferably a plurality of slots 34 are formed through the adapter plate 14, each circular slot having a diameter matching the diameter of a standard outlet 36 of a conventional round receptacle 38, as shown in FIG. 10. The circular discontinuous slots 34 are designed to permit a central portion 40 of the plate 14 to be frangibly removed from the plate to form a circular opening 42, which receives the circular outlet 36 of a round receptacle 38 when the adapter plate is to be used with a round receptacle. Providing a plurality of slots 34 allows different standard diameter openings 42 to be formed so that the plate can be adapted to round receptacle outlets 36 of different sizes.

Alternatively, instead of a single combination adapter plate 14, a plurality of adapter plates 15, 17, 19, 21 can be provided for use with a toggle switch 32 and/or a round receptacle. For example, the adapter plates 15 and 17 shown in FIGS. 3 and 4 are formed with a central rectangular toggle switch opening 28, which is sized and shaped to receive the lever 30 of a conventional toggle switch 32, and a single circular, discontinuous slot 34a, 34b centrally surrounding the toggle switch opening 28. The single circular, discontinuous slot 34a provided on the adapter plate 15 of FIG. 3 is sized to accommodate, for example, a standard 1 9/16" diameter round receptacle, whereas the single circular, discontinuous slot 34b provided on the adapter plate 17 of FIG. 4 is sized to accommodate, for example, a standard 1 3/8" diameter round receptacle. The adapter plate 19 shown in FIG. 5 only includes a central rectangular toggle switch opening 28 and the adapter plate 21 shown in FIG. 6 only includes a single circular opening 34.

All of the toggle switch/round receptacle adapter plates 14, 15, 17, 19, 21 are formed with two projections 16b longitudinally disposed at opposite ends of the plate. These projections 16b are sized to permit the projections to be inserted into opposite longitudinally disposed holes 44 formed in both the toggle switch 32 and the round receptacle 38. Like the duplex adapter plate 12 described above, insertion of the projections 16b into the holes 44 of the toggle switch 32 or the round receptacle 38 aligns the adapter plate 14 with the fixture.

Turning now to FIG. 7, the present invention further involves a universal face plate 46 preferably made from a thin, rigid and durable plastic material. The face plate 46 has an outer periphery 48 generally matching the perimeter of the opening of an electrical outlet box 50. The face plate 46 is further preferably formed with one or more apertures 52 for receiving a fastener 53 for mounting the face plate to the outlet box 50.

Figure 11:
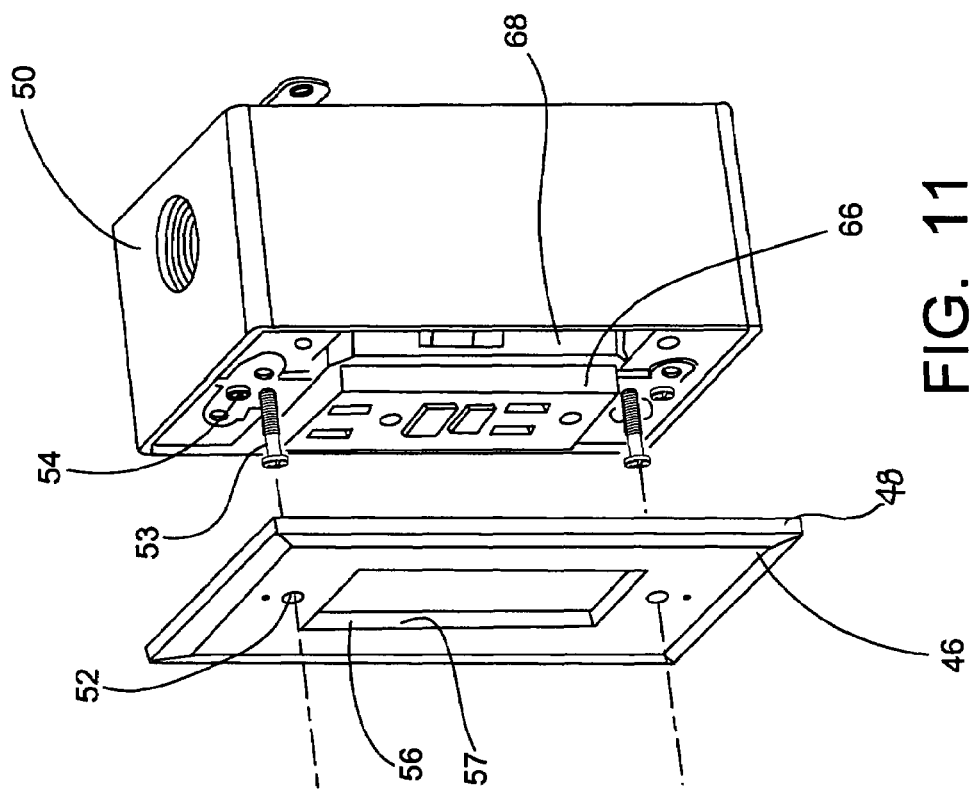
FIG. 11 is a side perspective view of the face plate member of the present invention being mounted to an electrical outlet box having a decorator-style fixture contained therein.

The face plate 46 is further formed with a central opening 56, which provides access to the electrical fixture 24, 32, 38, 68. The central opening 56 is sized to receive the rectangular dual outlet 66 of a conventional GFCI receptacle 68, as shown in FIG. 11, or a conventional non-GFCI decorator-type receptacle (not shown). In general, this would be the largest opening required for most types of conventional electrical fixtures. With these types of fixtures, no adapter plate is required, as the outlet 66 of the receptacle 68 will fit snugly within the opening 56 of the face plate 46.

The central opening 56 of the face plate 46 and the outer periphery of the adapter plate 12, 14, 15, 17, 19, 21 are also sized in a cooperating manner which will allow the adapter plate to be retained or "sandwiched" by the face plate upon assembly. Specifically, the central opening 56 of the face plate 46 is defined by an inner peripheral edge 57, which is sized so as to engage an outer peripheral surface 25 defining the outer periphery of the adapter plate 12, 14, 15, 17, 19, 21 when the adapter plate and the face plate 46 are assembled together. In this manner, the adapter plate butts against the back surface of the face plate and will therefore be retained or "sandwiched" against the electrical fixture by the face plate. This can be simply accomplished by forming the central opening 56 with a length and width that are respectively slightly smaller than the overall length and width of the adapter plate 12, 14, 15, 17, 19, 21.

However, in a preferred embodiment, the outer peripheral surface 25 of the adapter plate 12, 14, 15, 17, 19, 21 generally matches the central opening 56 of the face plate 46, but includes four outwardly extending ears 26 positioned adjacent the corners of the adapter plate. The ears 26 extend outwardly beyond the inner peripheral edge 57 of the central opening 56 of the face plate 46 and are therefore engaged by the face plate upon assembly.

In use, an electrical fixture, such as a duplex receptacle 24 as shown in FIG. 7, is electrically and mounted within an electrical outlet box 50 with suitable mounting hardware 54 provided with the electrical fixture. The appropriate adapter plate is then selected for the type of fixture mounted in the box. In this case, a duplex adapter plate 12 is selected for the exemplary duplex receptacle 24 shown in FIG. 7. Once the appropriate adapter plate is selected, the one or more projections 16 extending from the back of the adapter plate are inserted into the respective alignment holes 27, 44 of the respective receptacle 24, 38 or switch 32. The face plate 46 is then positioned over the adapter plate 12, whereby the periphery of the central opening 56 engages the outer periphery 25, 26 of the adapter plate. Fasteners 53 may then be inserted through the apertures 52 provided in the face plate 46 and secured within threaded apertures 55 provided on the outlet box 50 to secure the face plate to the box.

In this manner, the adapter plate 12 will be sandwiched between the face plate and the outer face of the electrical fixture 24. The outwardly extending ears 26, which are preferably provided on the adapter plate assist in sandwiching the plate. Because the adapter plate 12, 14, 15, 17, 19, 21 is not attached or coupled to the face plate 46, removal of the face plate will not remove the adapter plate. Thus, the adapter plate acts more like an "overlay," as opposed to prior art inserts. This is an important feature of the present invention in that the adapter plate 12, 14, 15, 17, 19, 21 is held in place by, but not coupled to, the electrical fixture and stays aligned via the projection(s) 16.

An additional external cover 60 may be mounted over the face plate 46, particularly in exterior installations. The cover 60 is preferably designed to be mounted to the electrical outlet box 50 regardless of the type of electrical fixture contained therein. The preferably unitary construction of the cover 60 may include a base plate 61 and a "flip-lid" 62 hingedly attached to the base plate to provide selective access to the fixture 24. In a known manner, the lid 62 can be spring biased to maintain the lid in a normally closed position. Also, the lid 62 preferably includes a gasket seal fitted to the cover 60 to provide a water-resistant seal against the face of the receptacle, as well as between the lid itself and the base plate 60.

As a result of the present invention, an electrical device face plate assembly is provided that can accommodate multiple types of electrical devices, such as duplex receptacles, GFCI receptacles, switches and round receptacles of varying sizes. The adapter plate locates in the holes of the electrical fixture and is thereby held in place. Thus, the adapter plate is not positioned, or mechanically coupled to the face plate, nor does the adapter plate extend through the opening of the face plate.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

For example, it is envisioned that the present invention can be adapted to multiple receptacle boxes. In this embodiment, a modified face plate is provided to accommodate multiple fixtures. Multiple adapter plates can be utilized or the adapter plate can be modified to accommodate multiple fixtures.

What is claimed is:

1. A face plate assembly for an electrical outlet box having an open side and an electrical fixture contained therein, the electrical fixture including an aperture, the face plate assembly comprising:

an adapter plate having an opening sized and shaped to receiving a portion of the electrical fixture therein, said adaptor plate further including a projection extending from a back face thereof, said projection having a width sufficiently smaller than a minimum width of the aperture of the electrical fixture, wherein said projection is adapted to be received in the aperture of the electrical fixture for aligning said adapter plate thereto whereby said projection is not attached or secured to the electrical fixture; and a face plate member sized to substantially enclose the electrical fixture, said face plate member having an opening for providing access to the electrical fixture and being adapted to sandwich said adapter plate against the electrical fixture when mounted to the outlet box.

2. A face plate assembly as defined in claim 1, wherein said adapter plate is not attached to said face plate member.

3. A face plate assembly as defined in claim 1, wherein said adapter plate is defined by an outer periphery and said opening in said face plate member is defined by an inner periphery, said inner periphery of said opening being smaller than said outer periphery of said adapter plate.

4. A face plate assembly as defined in claim 1, wherein said adapter plate includes an outwardly extending ear provided on a peripheral edge thereof, and wherein said opening of said face plate member is defined by an edge perimeter surface, said edge perimeter surface of said face plate engaging said outwardly extending ear to sandwich said adapter plate against the electrical fixture.

5. A kit for enclosing an electrical outlet box having an open side, the kit comprising:
   a first adapter plate having an outer peripheral edge and two receptacle openings sized and shaped to receive outlets of a duplex receptacle therein, said first adapter plate further including a projection extending from a back face thereof, said projection having a width sufficiently smaller than a minimum width of an aperture of the duplex receptacle, wherein said projection is adapted to be received in the aperture of the duplex receptacle for aligning said adapter plate thereto whereby said projection is not attached or secured to the duplex receptacle;
   a second adapter plate having an outer peripheral edge and an opening sized and shaped to receive a portion of at least one of a toggle switch and a round receptacle therein, said second adapter plate further including at least one projection extending from a back face thereof, said projection having a width sufficiently smaller than a minimum width of an aperture of one the toggle switch and round receptacle, wherein said projection is adapted to be received in the aperture of one of the toggle switch and round receptacle for aligning said adapter plate thereto whereby said projection is not attached or secured to the toggle switch or round receptacle; and
   a face plate member sized to substantially surround the electrical fixture mounted to the outlet box, said face plate member having an opening defined by an inner peripheral edge surface, said inner peripheral edge surface of said face plate being adapted to engage the outer peripheral edge of a selected one of said first and second adapter plates to sandwich said selected adapter plate against one of the duplex receptacle, the toggle switch or the round receptacle contained within the electrical outlet box.

6. The kit as defined in claim 5, wherein said outer peripheral edge of said first and second adapter plates includes an outwardly extending ear, said inner peripheral edge surface of said face plate member being adapted to engage said outwardly extending ear to sandwich said selected adapter plate.

7. The kit as defined in claim 5, wherein said first adapter plate includes a single, centrally disposed projection adapted to be received in a centrally disposed aperture of the duplex receptacle.

8. The kit as defined in claim 5, wherein said second adapter plate includes a centrally disposed rectangular opening formed therein and adapted to receive a toggle member of a toggle switch therethrough.

9. A kit as defined in claim 8, wherein said second adapter plate further includes a first circular, discontinuous slot formed therethrough around said rectangular opening, said first discontinuous slot permitting a first circular portion of said adapter plate to be frangibly removed to form a first circular opening in said second adapter plate adapted to receive a circular outlet of a round receptacle.

10. A kit as defined in claim 9, wherein said second adapter plate further includes a second circular, discontinuous slot formed therethrough around said first circular, discontinuous slot, said second discontinuous slot permitting a second circular portion of said adapter plate to be frangibly removed to form a second circular opening in said second adapter plate adapted to receive a circular outlet of a round receptacle.

11. A kit as defined in claim 5, wherein said second adapter plate includes two projections extending from said back face thereof, said projections being disposed at opposite longitudinal ends of said second adapter plate.

12. A kit as defined in claim 5, wherein said second adapter plate includes a circular opening adapted to receive a circular outlet of a round receptacle.

13. An electrical outlet box assembly comprising:
   an electrical outlet box having an open side;
   an electrical fixture contained within said electrical outlet box, said electrical fixture including an aperture;
   a face plate member enclosing the electrical fixture within the electrical outlet box, said face plate member having an opening for providing access to the electrical fixture; and
   an adapter plate sandwiched between said face plate member and said electrical fixture, said adapter plate having an opening sized and shaped to receiving a portion of the electrical fixture therein and a projection extending from a back face thereof, said projection having a width sufficiently smaller than a minimum width of the aperture of the electrical fixture, wherein said projection is adapted to be received in the aperture of the electrical fixture for aligning said adapter plate thereto whereby said projection is not aft ached or secured to the electrical fixture.

14. An electrical outlet box assembly as defined in claim 13, wherein said adapter plate is not attached to said face plate member.

15. An electrical outlet box assembly as defined in claim 13, wherein said adapter plate is not attached to said electrical fixture.

16. A method for covering an electrical fixture within an electrical outlet box having an electrical fixture contained therein, the method comprising the steps of:
   inserting a projection formed on a back face of an adaptor plate into an aperture provided in the electrical fixture, said projection having a width sufficiently smaller than a minimum width of the aperture of the electrical fixture, wherein said projection is received in the aperture, but is not attached or secured to the electrical fixture, whereby the adapter plate is aligned with the electrical fixture, said adapter plate having an opening sized and shaped to receive a portion of the electrical fixture therein; and
   mounting a face plate member to cover the electrical fixture, said face plate member having an opening defined by an inner peripheral edge surface, said inner peripheral edge surface engaging an outer peripheral edge of said adapter plate, wherein said adaptor plate is sandwiched between said face plate member and the electrical fixture.

17. A method as defined in claim 16, wherein said adaptor plate is not attached to said face plate member.

18. A method as defined in claim 16, wherein said adapter plate is not attached to the electrical fixture.

19. A method as defined in claim 16, further comprising the step of selecting said adapter plate from a plurality of adapter plates based on the type of electrical fixture contained in the electrical outlet box.

20. A method as defined in claim 16, further comprising the step of removing a portion of said adapter plate to create said opening to receive the portion of the electrical fixture therein.

* * * * *

UNITED STATES PATENT AND TRADEMARK OFFICE
CERTIFICATE OF CORRECTION

| | |
|---|---|
| PATENT NO. | : 7,622,676 B2 |
| APPLICATION NO. | : 11/805258 |
| DATED | : November 24, 2009 |
| INVENTOR(S) | : Drane et al. |

It is certified that error appears in the above-identified patent and that said Letters Patent is hereby corrected as shown below:

IN THE CLAIMS:

Column 8, line 27,   now reads "not aft ached or"
                     should read --not attached or--

Signed and Sealed this

Thirteenth Day of April, 2010

David J. Kappos
*Director of the United States Patent and Trademark Office*